Patented Mar. 29, 1932

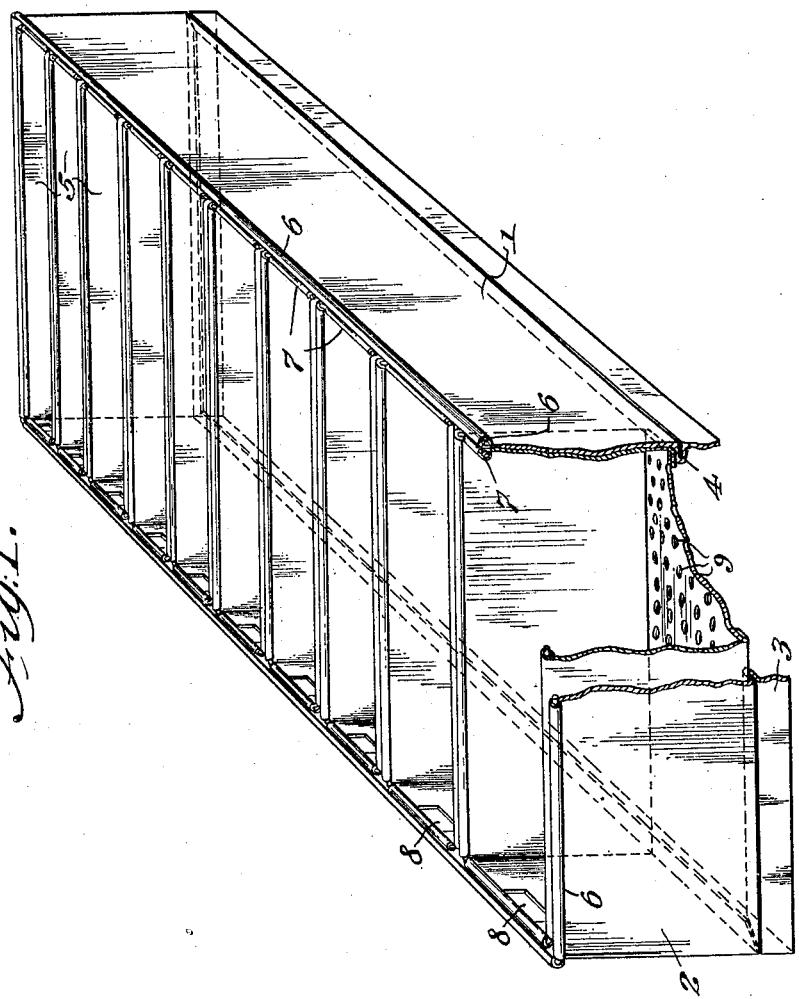

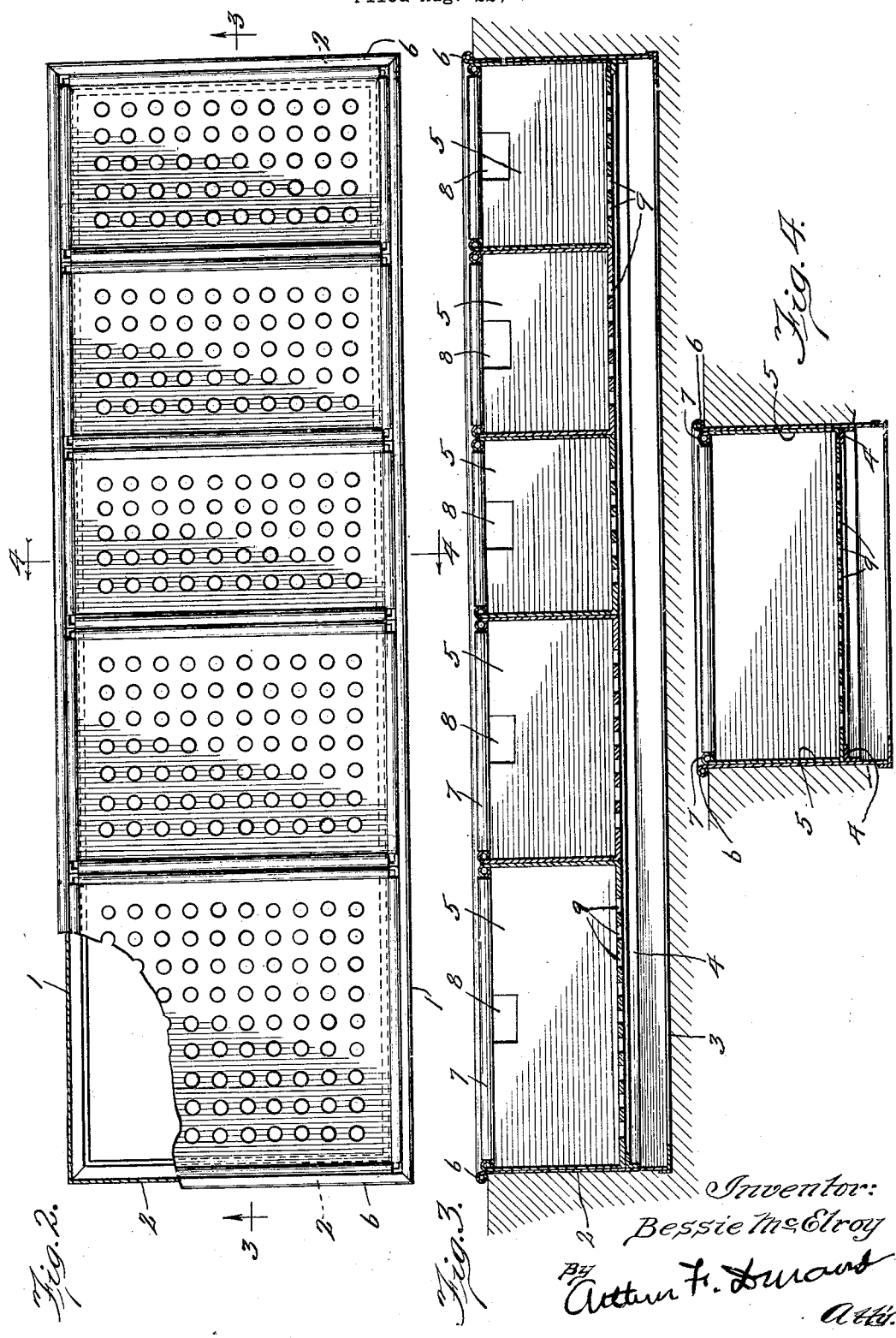

1,851,052

UNITED STATES PATENT OFFICE

BESSIE McELROY, OF CHICAGO, ILLINOIS

GRAVE FORM

Application filed August 22, 1929. Serial No. 387,780.

This invention relates to boxes for flowers, more particularly for use on graves in cemeteries.

Generally stated, the object of the invention is to provide a novel and improved construction whereby a plurality of separately removable boxes are provided in an outside box of some length, all forming a unitary structure, which outside box can be sunk in the ground over or near the grave, whereby the different boxes can be taken out and put back, for any desired purpose, in an easy and convenient manner.

It is also an object to provide certain details and features of construction tending to increase the general efficiency and the desirability of a box for flowering plants of this particular character.

To the foregoing and other useful ends, the invention consists in the matters hereinafter set forth and claimed, and shown in the accompanying drawings, in which,—

Fig. 1 is a perspective of a flowering plant box embodying the principles of the invention, showing one corner portion thereof broken away for convenience of illustration.

Fig. 2 is a plan of said box, with certain portions broken away for convenience of illustration.

Fig. 3 is a longitudinal vertical section on line 3—3 in Fig. 2 of the drawings.

Fig. 4 is a transverse section on line 4—4 in Fig. 2 of the drawings.

As thus illustrated, the invention comprises an outside box, or box-like frame, having vertical side walls 1 and vertical end walls 2, as shown. Preferably, the box has an open bottom 3, as shown, and a distance above this bottom there is a shelf or ledge 4, forming an inwardly pressed rib, extending around the inside of the box or box-like frame. The individual sheet-metal boxes or containers 5 rest upon the shelf or ledge 4, as shown.

Preferably, the outer box or box-like frame has its upper edge provided with a rolled-over rim portion 6, forming an outwardly rolled bead which may serve as a sort of handle for lifting the box-like frame out of the ground. The individual boxes 5 also have their upper edges provided with rolled-over portions 7, forming inwardly rolled beads, the portions 6 being rolled outwardly, while the portions 7 are rolled inwardly, as shown. The boxes 5 may have their end walls provided with openings 8 for the hands, to facilitate handling of the boxes.

Preferably, the bottoms of the boxes 5 have perforations, or openings 9, as shown.

In use, the outer box or box-like frame is sunk in the ground, over the grave, or near by, in the manenr shown. The boxes 5 are then filled with flowering plants, or other plants, and are placed in position, as shown. The boxes 5 and their contents can be taken up and placed in a greenhouse for winter care.

The boxes 5 can be taken out separately, should occasion require, for convenience in rearranging the flowering plants.

What I claim as my invention is:

1. Means for holding plants, comprising an outer open top box or box-like frame to be sunk in the ground, having an open bottom to permit moisture to ascend from the ground within the box, and a plurality of open top plant boxes supported within said outer box or box-like frame, with their upper edges substantially in the plane of the upper edges of said outer box, said inner boxes being individually removable straight up from said outer box or box-like frame, having handles for this purpose adjacent the upper edges of said outer box, and having openings to permit said moisture to reach the plants, and to drain any excess water therefrom.

2. A structure as specificed in claim 1, said inside boxes having perforated bottoms.

3. A structure as specified in claim 1, said outer box or box-like frame having an inner ledge or shelf for supporting the plant boxes with their bottoms a distance above the bottom of said outer box or box-like frame.

4. A structure as specified in claim 1, said outer box or box-like frame being of sheet-metal and having rolled upper edges, and said inner boxes being of sheet-metal and having rolled upper edges.

5. The combination, in a grave form, of a body comprising vertical walls fastened together at their ends to form an enclosure open at both top and bottom, each of said walls having an outwardly rolled bead at its top edge and an inwardly pressed rib intermediate its top and bottom edges, and a plurality of flower boxes each having a perforated bottom adapted to be supported by said rib and an inwardly rolled bead around the top edge of each of said flower boxes.

6. A grave form comprising a hollow body with open top and bottom ends and an inwardly extending rib intermediate said ends supporting a plurality of flower boxes, each of said boxes having a perforated bottom and an inwardly rolled bead at the top.

Mrs. BESSIE McELROY.